SUPERCONDUCTIVE CIRCUITS

Filed March 30, 1960

5 Sheets-Sheet 1

INVENTOR
JOHN L. ANDERSON
BY Frederick J. Smyth
ATTORNEY

April 20, 1965 J. L. ANDERSON 3,179,925

SUPERCONDUCTIVE CIRCUITS

Filed March 30, 1960 5 Sheets-Sheet 3

April 20, 1965 J. L. ANDERSON 3,179,925

SUPERCONDUCTIVE CIRCUITS

Filed March 30, 1960 5 Sheets-Sheet 4

April 20, 1965 J. L. ANDERSON 3,179,925

SUPERCONDUCTIVE CIRCUITS

Filed March 30, 1960 5 Sheets-Sheet 5

United States Patent Office 3,179,925
Patented Apr. 20, 1965

3,179,925

SUPERCONDUCTIVE CIRCUITS

John L. Anderson, Poughkeepsie, N.Y., assignor to International Business Machines Corporation, New York, N.Y., a corporation of New York Filed Mar. 30, 1960, Ser. No. 18,627
3 Claims. (Cl. 340—173.1)

This invention relates to a superconductive switching network useful as a ring or commutator circuit and more particularly to a superconductive switching network which is selectively conditioned to develop a predetermined order of output manifestations.

According to the prior art, ring or commutator circuits include a plurality of similar operating networks or stages effective to produce a predetermined sequence of output manifestations at accurately prescribed times. Such circuits are useful, by way of example, in connection with timing and coordinating the operations of various portions of present day computers and other large scale systems. Each stage of the commutator is capable of assuming an ON and OFF state, and is effective to develop an output manifestation only when in the ON state. Generally, only one stage is in the ON state at any particular time, and the ON stage is further effective to switch a predetermined succeeding stage to the ON state and simultaneously to switch a predetermined preceding stage to the OFF state. In this manner, a predetermined sequence of output manifestations is obtained, proceeding from the lowest order stage to the highest order stage. Moreover, commutator circuits may be further classified as either fixed or free-running commutators. In the fixed mode of operation, an output manifestation is obtained from the lowest order stage, and the sequence proceeds until an output manifestation is obtained from the highest order stage, at which time the cycle is terminated with the highest order stage remaining in the ON state until a start or clock pulse is effective to start the cycle again. In the free running type of operation, when the highest order stage is switched to the ON state, this stage is effective to switch the lowest order stage to the ON state and the cycle hereupon repeats itself.

Accordingly, the subject invention as demonstrated by the embodiment disclosed herein by way of example, provides a commutator capable of being conditioned to develop output manifestations in accordance with the logical rules of the prior art, and is further capable of being conditioned to develop one or more output manifestations in any predetermined sequence. In the preferred embodiment of the invention, described in detail hereinafter, cryotron type devices are employed as the circuit elements of the commutator of the invention, it being understood that various other devices may be so employed in attaining the advantages afforded by the commutator of the invention.

Briefly, a cryotron comprises a first, or gate, conductor, the resistance of which, either superconducting or resistive, is controlled by a second, or control, conductor. The cryotron is normally operated at a sufficiently low temperature so that the gate conductor normally exhibits zero electrical resistance to the flow of an electric current. Current flow of at least a predetermined magnitude through the associated control conductor is effective to generate a magnetic field, which, when applied to the gate conductor, destroys superconductivity therein, and the gate conductor then exhibits normal electrical resistance. The interconnection of gate and control conductors is then effective to form various logical circuits, amplifiers, and/or oscillators. Further, when two electrical paths exist in parallel, one of which is totally superconducting and a portion of the other exhibits resistance, a current applied to these paths flows entirely in the superconducting path. In this manner, resistance appearing in only one of two parallel paths is effective to convert that path into an open circuit. Moreover, when the resistive path becomes superconducting, after a current has been established in a parallel superconducting path, the current continues to flow in the original superconducting path until an external force is effective to shift some or all of the current into the second superconducting path.

Cryotron type devices have been employed in programmable ring circuits as, by way of example, disclosed in copending application Serial No. 783,480 now Patent #3,002,111 filed December 29, 1958, on behalf of David J. Dumin, and assigned to the assignee of this invention. As there disclosed, the ring circuit can be programmed to control the duration of the output manifestations by having each operating stage effective when it itself is switched to the ON state, to switch the second preceding stage in the ring to the OFF state; or, to switch the fourth preceding stage to the OFF state; or, to switch the sixth preceding stage to the OFF state, etc. The commutator of the invention, however, consists of a plurality of operating stages and a starting stage, each stage including a plurality of cryotron type devices, in the illustrated preferred embodiment, wherein each stage is individually programmable to switch any one or more operating stages to the ON state and/or to switch any one or more operating stages to the OFF state. Each operating stage is adapted to accept the current from the immediate preceding stage, and when in the OFF state, to deliver the current to the next succeeding stage, without itself developing an output manifestation. Switching an operating stage to the ON state is effective to direct the curent from the immediate preceding stage first through the control conductor of an output cryotron, and second through a programmable cryotron matrix to switch one or more other operating stages, either a preceding or a succeeding stage, to the ON state and/or to the OFF state and thence to the next operating stage of the commutator. A sequence of output manifestations is thereby obtained, until either the cycle of operation is completed, or, depending on the program set up in the stages, the cycle is repeated. Further, the stages are conditionable such that outputs do not have to occur stage by stage, rather the output manifestations are obtainable in time independent of the location of a particular operating stage in the chain.

An object of the invention, therefore, is to provide an improved superconductive switching network operable as a commutator or ring circuit.

Another object of the invention is to provide an improved programmable commutator.

Yet another object of the invention is to provide a superconductive switching network including a plurality of operating stages for developing output manifestations wherein outputs may be time developed independent of the location of the stage in the network.

Still another object of the invention is to provide a superconductive commutator circuit wherein the sequence of output manifestations is determined solely by a program stored in the commutator itself.

A further object of the invention is to provide a superconductive commutator including a plurality of stages wherein a stage is programmable to switch one or more other stages between the ON and OFF states when the stage itself is switched to the ON state.

The foregoing and other objects, features and advantages of the invention will be apparent from the following more particular description of a preferred embodiment of the invention, as illustrated in the accompanying drawings.

In the drawings:

FIG. 1 illustrates the manner in which FIGS. 1*a* through 1*d* together form a schematic diagram of an embodiment of the switching network of the invention.

FIG. 1*a* is a schematic diagram of a portion of the switching network of the invention.

FIG. 1*b* is a schematic diagram of another portion of the switching network of the invention.

FIG. 1*c* is a schematic diagram of still another portion of the switching network of the invention.

FIG. 1*d* is a schematic diagram of yet another portion of the switching network of the invention.

Figure 1:
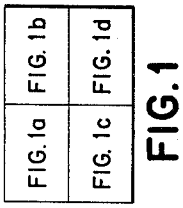

Referring now to the drawings, FIG. 1 illustrates the manner in which FIGS. 1*a* through 1*d* together form a block diagram of the commutator of the invention. Hereinafter, the schematic diagram will generally be referred to as FIG. 1, the particular drawings, FIGS. 1*a* through 1*d* being referred to as required. As illustrated by the general schematic formed by FIG. 1, the commutator of the invention consists of six stages, indicated as stages A through F, although as will be understood as the description proceeds, a greater or lesser number of stages can be employed as required. Stages A through E comprise the operating stages which are effective to selectively develop the output manifestations. Stage F functions as the starting stage which is selectively operable to start an operation cycle.

Figure 1A:
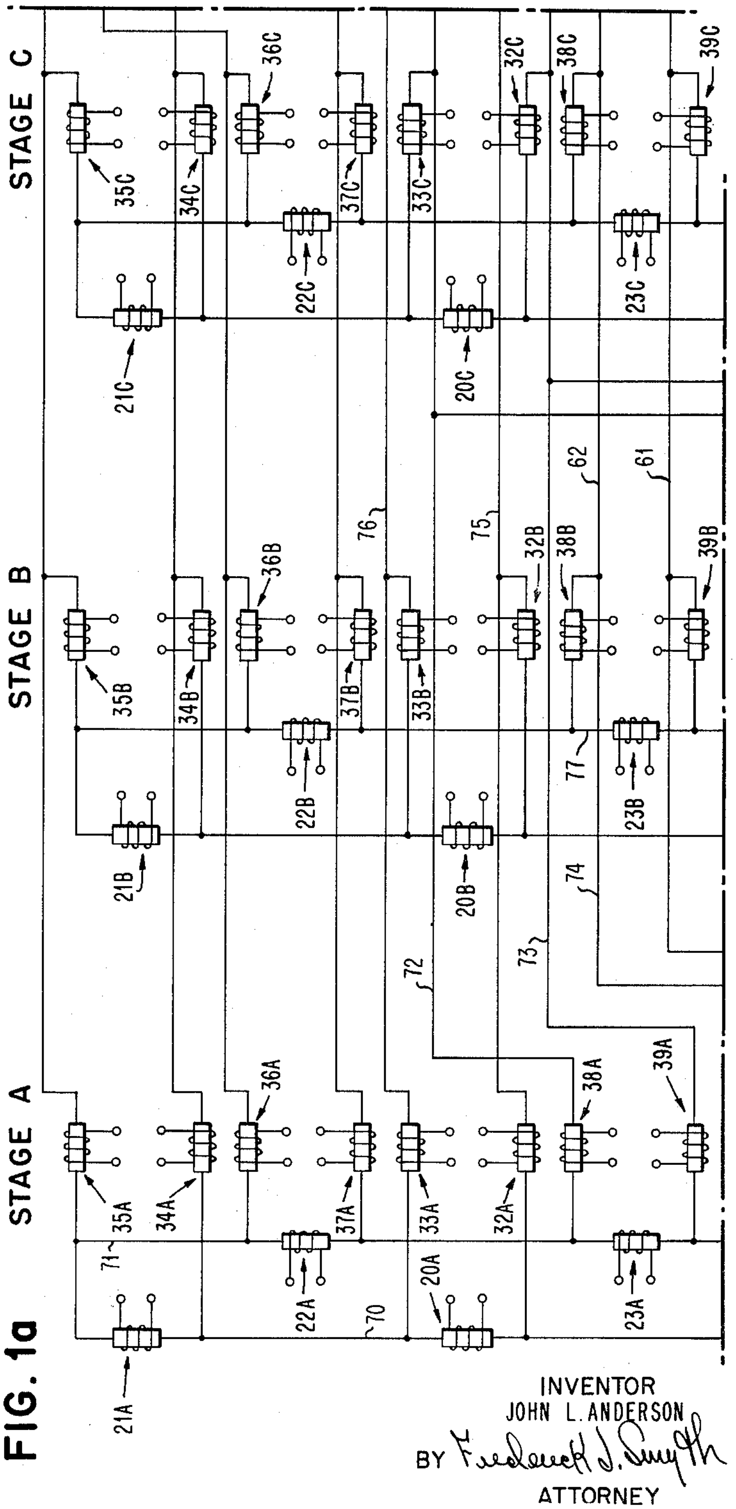
Figure 1B:
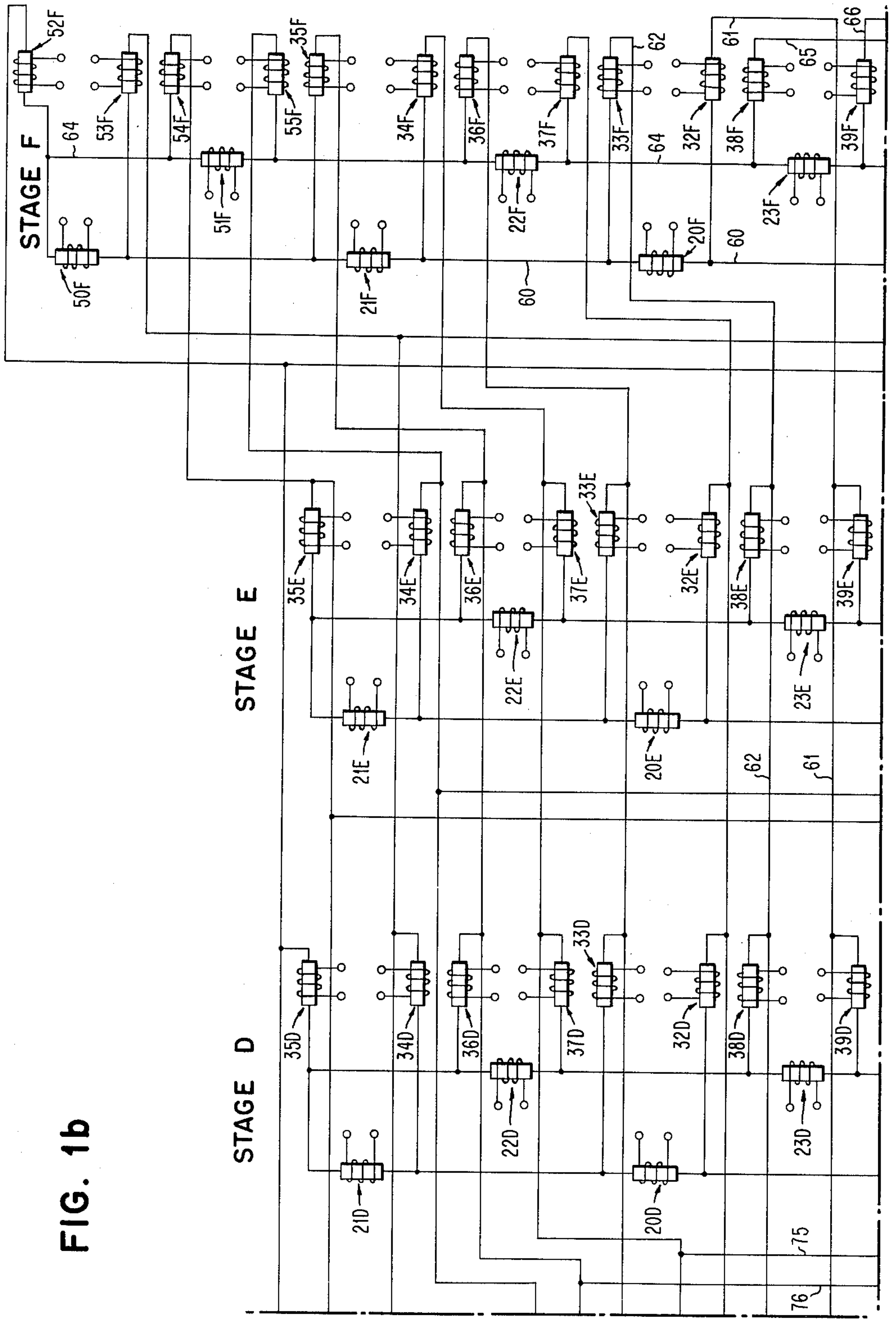
Figure 1C:
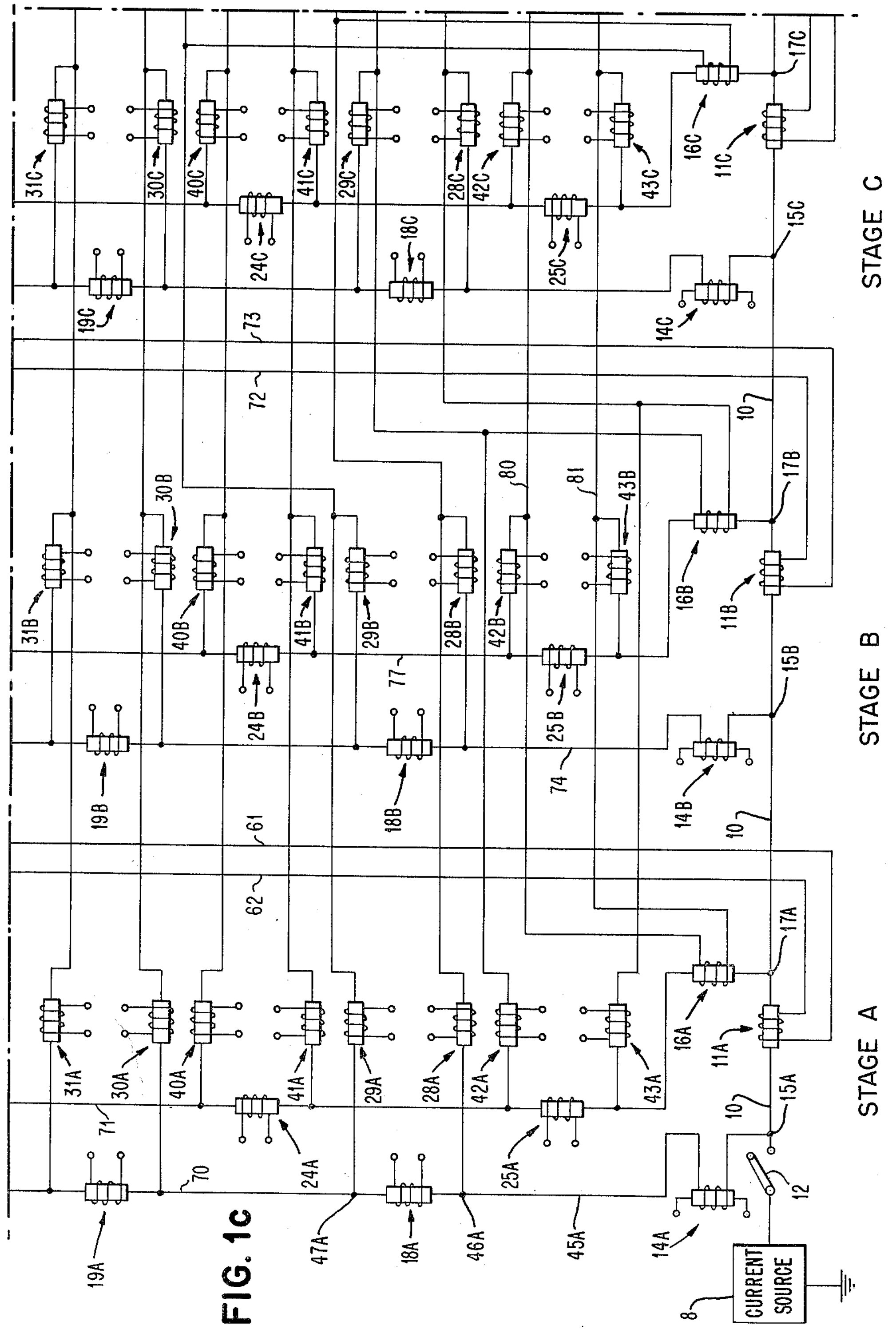
Figure 1D:
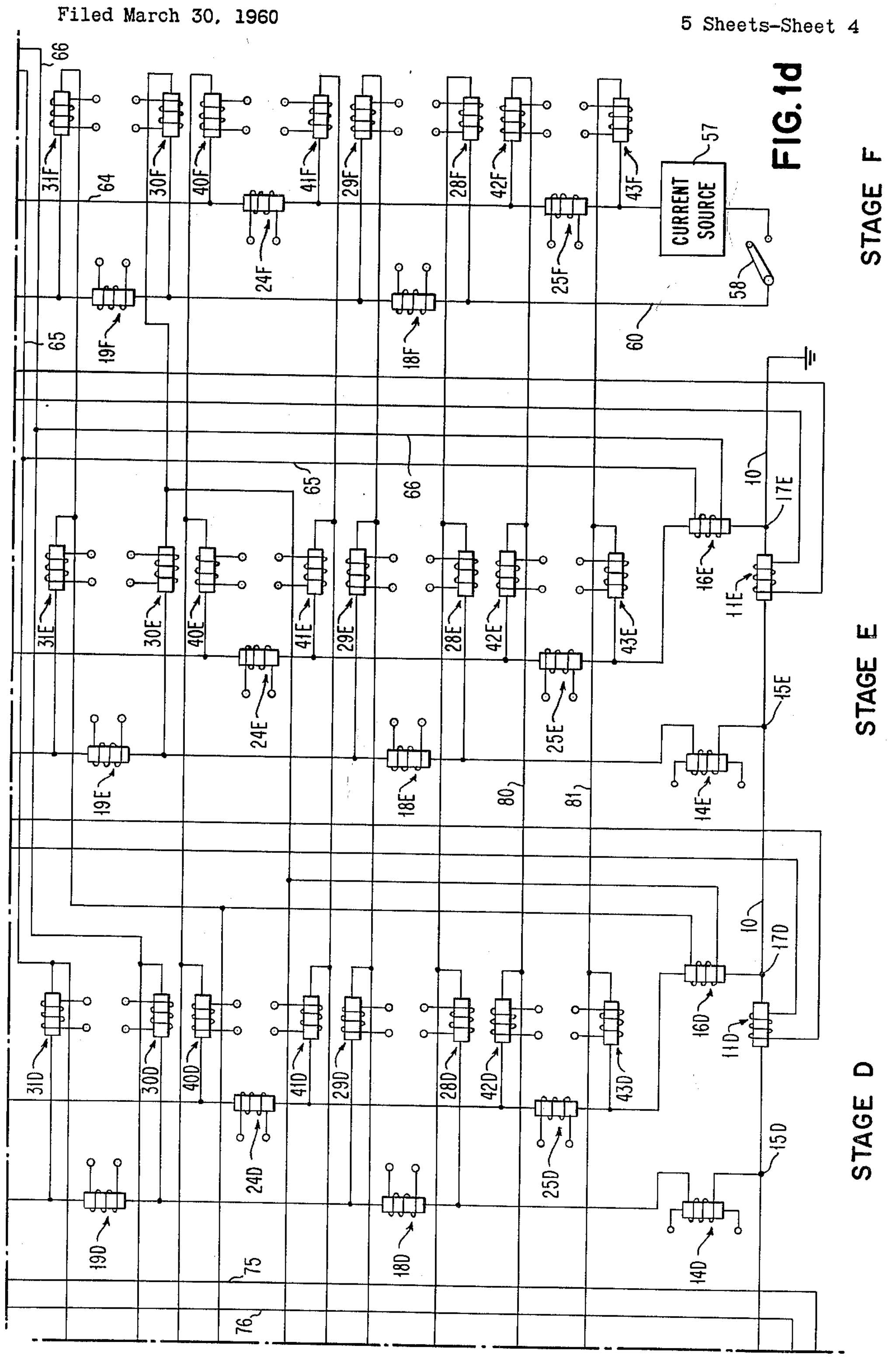

As shown in FIGS. 1*c* and 1*d*, each operating stage is connected between a current source 8 and ground by means of a line 10, which is effective to connect the gate conductor of a set cryotron of each stage, 11A, 11B, 11C, 11D and 11E, electrically in series. Current from source 8, under control of a switch 12, normally flows therefrom, through each of the gate conductors of the set cryotrons to ground. Electrically connected in parallel with the gate conductors of each of the set cryotrons is a further possible superconducting path which includes the control conductor of an output cryotron, 14A through 14E, a cryotron matrix to be more particularly hereinafter described, and the gate conductor of a reset cryotron 16A through 16E. More particularly, with reference to stage A (FIG. 1*c*), the control conductor of output cryotron 14A is connected to line 10 at a junction 15A. In like manner the gate conductor of reset cryotron 16A is connected to line 10 at a junction 17A, junctions 15A and 17A being located on either side of the gate conductor of set cryotron 11A. Electrically connected in series between the control conductor of output cryotron 14A and the gate conductor of reset cryotron 16A are the gate conductors of a series of eight cryotrons, 18A, 19A, 20A, 21A, 22A, 23A, 24A and 25A (see FIGS. 1*a* and 1*c*), which form a first portion of the cryotron matrix of operating stage A. The matrix is completed by a further group of eight pairs of cryotrons, 28A and 29A, through 42A and 43A, the gate conductors of which are electrically connected in parallel with each of the eight serially connected cryotrons 18A through 25A. Thus, the gate conductors of cryotrons 28A and 29A are electrically in parallel with the gate conductor of cryotron 18A, the gate conductors of cryotrons 30A and 31A are electrically in parallel with the gate conductor of cryotron 19A, and continuing in like manner, the gate conductors of cryotrons 42A and 43A are electrically in parallel with the gate conductor of cryotron 25A. Each group of three cryotrons together function as a switch with the two parallelly connected cryotrons being in the same resistive state and together being in the state opposite to that of the serially connected cryotron. In this manner, current from source 8 flowing through the control conductor of output cryotron 14A continues along a line 45A to a junction 46A. Assuming the gate conductor of cryotron 18A to be superconducting and therefore that the gate conductors of cryotrons 28A and 29A are each resistive, the current arriving at junction 46A flows through the gate conductor of cryotron 18A to a junction 47A. Alternatively, with the gate conductor of cryotron 18A resistive and thus the gate conductors of cryotrons 28A and 29A each superconducting, the current arriving at junction 46A now flows through the gate conductor of cryotron 28A, and is then effective to switch stage C to the OFF state as will be hereinafter described in detail, thence flows through the gate conductor of cryotron 29A to junction 47A. In an analogous manner, the group of cryotrons 19A, 30A and 31A are selectively conditioned to switch stage E to the OFF state, cryotrons 20A, 32A and 33A (FIG. 1*a*), are selectively conditioned to switch stage C to the ON state, cryotrons 21A, 34A and 35A are selectively conditioned to switch stage E to the ON state, cryotrons 22A, 36A and 37A are selectively conditioned to switch stage D to the ON state, cryotrons 23A, 38A and 39A are selectively conditioned to switch stage B to the ON state, cryotrons 24A, 40A and 41A are selectively conditioned to switch stage D to the OFF state, and cryotrons 25A, 42A and 43A are selectively conditioned to switch stage B to the OFF state. It is seen, therefore, that four of the eight serially connected cryotrons in the matrix of stage A are each operable to switch one of the other operating stages to the ON state and four of the eight serially connected cryotrons are each operable to switch one of the other operating stages to the OFF state. Each of the remaining operating stages, B through E, additionally include a cryotron matrix with eight cryotrons, connected in series between the control conductor of the output cryotron and the gate conducor of the reset cryotron, which are selectively conditioned to switch each of the remaining operating stages to either the ON state or the OFF state in a manner similar to that described above with respect to stage A. Additionally, starting stage F (FIGS. 1*b* and 1*d*), is programmable to switch any operating stage to the ON state and to the OFF state. Starting stage F differs from an operating stage in that set, reset, and ouput cryotrons are not included thereat. Rather the cryotron matrix is connected in series with a current source 57 and a switch 58. The matrix of stage F includes ten serially connected gate conductors in series with source 57 each of which is programmable to selectively switch an operating stage to the ON state or to the OFF state in conjunction with its associated pair of cryotrons in a similar manner as an operating state. Summarized in Table I, is the state controlled by the serially connected cryotrons in the matrices of the operating stages and the starting stage.

*Table I*

| Stage A | | Stage B | | Stage C | | Stage D | | Stage E | | Stage F | |
|---|---|---|---|---|---|---|---|---|---|---|---|
| Cryotron | Effective to switch stage | Cryotron | Effective to switch stage | Cryotron | Effective to switch stage | Cryotron | Effective to switch stage | Cryotron | Effective to switch stage | Cryotron | Effective to switch stage |
| 18A | C to OFF. | 18B | C to OFF. | 18C | B to OFF. | 18D | B to OFF. | 18E | B to OFF. | 18F | B to OFF. |
| 19A | E to OFF. | 19B | E to OFF. | 19C | E to OFF. | 19D | E to OFF. | 19E | D to OFF. | 19F | D to OFF. |
| 20A | C to ON. | 20B | C to ON. | 20C | B to ON. | 20D | B to ON. | 20E | B to ON. | 20F | A to ON. |
| 21A | E to ON. | 21B | E to ON. | 21C | E to ON. | 21D | E to ON. | 21E | D to ON. | 21F | C to ON. |
| 22A | D to ON. | 22B | D to ON. | 22C | D to ON. | 22D | C to ON. | 22E | C to ON. | 22F | B to ON. |
| 23A | B to ON. | 23B | A to ON. | 23C | A to ON. | 23D | A to ON. | 23E | A to ON. | 23F | E to OFF. |
| 24A | D to OFF. | 24B | D to OFF. | 24C | D to OFF. | 24D | C to OFF. | 24E | C to OFF. | 24F | C to OFF. |
| 25A | B to OFF. | 25B | A to OFF. | 25C | A to OFF. | 25D | A to OFF. | 25E | A to OFF. | 25F | A to OFF. |
| | | | | | | | | | | 50F | E to ON. |
| | | | | | | | | | | 51F | D to ON. |

As has been stated above, current from source 8 normally flows along line 10, through the gate conductor of the set cryotron 11 of each operating stage to ground. When a stage is switched to the ON state, by current flow through the control conductor of the set cryotron, the path between junctions 15 and 17 is caused to become resistive shifting the current from the normal path into the cryotron matrix at the particular stage. This current then flows through the control conductor of the output cryotron 14 causing the gate conductor thereof to become resistive. The resistive gate conductor is then effective to develop an output manifestation in a manner well known in the art. Next, the current flows through the cryotron matrix and is caused to switch one or more other operating stages to the ON state, and/or switch one or more other operating stages to the OFF state, the current then returning to line 10 through the gate conductor of reset cryotron 16. The ON stage is switched to the OFF state by current flow, under control of another stage, through the control conductor of reset cryotron 16 during a time interval when the gate conductor of set cryotron 11 is superconducting.

As an aid in understanding the operation of the commutator of the invention, several programs are next described in detail, at the conclusion of which it should be apparent that many other programs are possible. The first described program illustrates the commutator as a conventional ring circuit, wherein an output manifestation is first developed at the lowest order stage, that is stage A, and progressively continues with outputs developed at each intermediate stage until an output is developed at the highest order stage, stage E. In order to generate this sequence of output manifestations, the control conductors of various cryotrons in the matrix of each stage are energized to cause the gate conductor associated therewith to become resistive. As indicated in the schematic diagram shown in FIGS. 1*a* through 1*d*, the control conductors of the matrix cryotrons are indicated as terminating in hubs which may be secured to a common plug board and the required control conductors can be connected in series with a common current source (not shown). Table II lists the matrix cryotrons of each stage and indicates the state of the gate conductor associated therewith either superconducting (S) or resistive (R), required for the above described program.

*Table II*

| Stage A | Stage B | Stage C | Stage D | Stage E | Stage F |
|---|---|---|---|---|---|
| 18A—S | 18B—S | 18C—R | 18D—S | 18E—S | 18F—S |
| 28A—R | 28B—R | 28C—S | 28D—R | 28E—R | 28F—R |
| 29A—R | 29B—R | 29C—S | 29D—R | 29E—R | 29F—R |
| 19A—S | 19B—S | 19C—S | 19D—S | 19E—R | 19F—S |
| 30A—R | 30B—R | 30C—R | 30D—R | 30E—S | 30F—R |
| 31A—R | 31B—R | 31C—R | 31D—R | 31E—S | 31F—R |
| 20A—S | 20B—R | 20C—S | 20D—S | 20E—S | 20F—R |
| 32A—R | 32B—S | 32C—R | 32D—R | 32E—R | 32F—S |
| 33A—R | 33B—S | 33C—R | 33D—R | 33E—R | 33F—S |
| 21A—S | 21B—S | 21C—S | 21D—R | 21E—S | 21F—S |
| 34A—R | 34B—R | 34C—R | 34D—S | 34E—R | 34F—R |
| 35A—R | 35B—R | 35C—R | 35D—S | 35E—R | 35F—R |
| 22A—S | 22B—S | 22C—R | 22D—S | 22E—S | 22F—S |
| 36A—R | 36B—R | 36C—S | 36D—R | 36E—R | 36F—R |
| 37A—R | 37B—R | 37C—S | 37D—R | 37E—R | 37F—R |
| 23A—R | 23B—S | 23C—S | 23D—S | 23E—S | 23F—R |
| 38A—S | 38B—R | 38C—R | 38D—R | 38E—R | 38F—S |
| 39A—S | 39B—R | 39C—R | 39D—R | 39E—R | 39F—S |
| 24A—S | 24B—S | 24C—S | 24D—R | 24E—S | 24F—S |
| 40A—R | 40B—R | 40C—R | 40D—S | 40E—R | 40F—R |
| 41A—R | 41B—R | 41C—R | 41D—S | 41E—R | 41F—R |
| 25A—S | 25B—R | 25C—S | 25D—S | 25E—S | 25F—S |
| 42A—R | 42B—S | 42C—R | 42D—R | 42E—R | 42F—R |
| 43A—R | 43B—S | 43C—R | 43D—R | 43E—R | 43F—R |
| | | | | | 50F—S |
| | | | | | 52F—R |
| | | | | | 53F—R |
| | | | | | 51F—S |
| | | | | | 54F—R |
| | | | | | 55F—R |

With each of the stages programmed as shown in Table II, and current from source 8 established in the normal path including line 10 and the gate conductors of the set cryotrons 11A through 11E (FIGS. 1*c* and 1*d*) as more particularly hereinafter described, the operation cycle is under control of starting stage F. Although superconducting paths exist in parallel with the gate conductor of each set cryotron, no current flows therethrough at this time since the current is already established in another superconducting path. Closure of switch 58 (FIG. 1*d*) is effective to direct current from source 57 into the cryotron matrix of stage F along a line 60 and through the superconducting gate conductors of cryotrons 18F and 19F (see Table II), since as hereinbefore stated, and as shown in Table II, the gate conductors of the pair of cryotrons associated and in parallel with each of the gate conductors of the serially connected cryotrons of the matrix are in the conduction state opposite thereto. However, because the gate conductor of cryotron 20F is resistive, current from source 57 is directed through the superconducting gate conductor of cryotron 32F along a line 61, continuing along line 61 to the control conductor of set cryotron 11A of stage A (FIGS. 1*b*, 1*a* and 1*c*). Each possible path existing in parallel with line 61 is blocked by the resistive gate conductors of cryotrons 39E, 39D, 39C and 39B. This current flow through the control conductor of set cryotron 11A causes the associated gate conductor thereof to become resistive and therefore the current from source 8 flowing therethrough begins to shift into the alternate superconducting path provided by the matrix of stage A. The current from source 57 flowing through the control conductor of set cryotron 11A next continues along a line 62, continuing along line 62 and through the superconducting gate conductor of cryotron 33F (FIGS. 1*c*, 1*a* and 1*b*), to line 60. Again the possible paths existing in parallel with line 62 are blocked by the resistive gate conductors of cryotrons 38B, 38C, 38D and 38E. Because the gate conductor of cryotron 20F is resistive, the current from source 57 continues along line 60 and through the superconducting gate conductors of cryotrons 21F and 50F to a line 64. This current continues along line 64, through the superconducting gate conductors of cryotrons 51F and 22F and, since the gate conductor of cryotron 23F is resistive (Table II), thence through the superconducting gate conductors of cryotron 38F to a line 65 (FIGS. 1*b* and 1*d*). Next, the current flows along line 65 to the control conductor of reset cryotron 16E, the possible parallel paths connected to line 65 being blocked by the resistive conductors of cryotrons 31D, 31C, 31B and 31A (FIGS. 1*d* and 1*c*). Current flow through the control conductor of reset cryotron 16E causes the gate conductor associated therewith to become resistive. However, during this first cycle of operation, stage E is in the OFF state and the energization of cryotron 16E has no effect at this time. Next, current flows along a line 66 and through the superconducting gate conductor of cryotron 39F to line 64. Next, current returns to source 57 along line 64 and through the superconducting gate conductors of cryotrons 24F and 25F. Starting stage F is thus effective upon closure of switch 58 to switch stage A to the ON state and to switch stage E to the OFF state.

Figure 2:
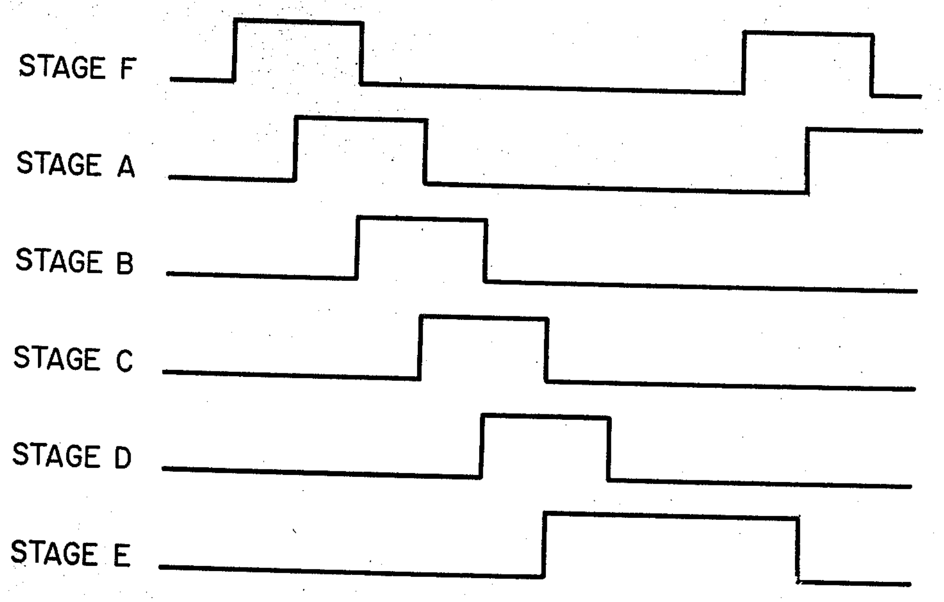
FIG. 2 illustrates the output manifestations as a function of time of the switching network of the invention during a cycle of operation of a first program.

Returning now to stage A, it has been stated above that current from source 8 shifts into the matrix thereat. However, due to the inductance in the superconducting path through the matrix, a finite time is required for the current to shift sufficiently from the normal path to produce an output manifestation, as is indicated in the timing waveforms shown in FIG. 2 which illustrates the output manifestations developed by the operating stages after the starting stage has been energized.

The current from source 8 now flowing in the matrix of stage A, initially flows through the control conductor of output cryotron 14A, switching the gate conductor thereof to the resistive state, along line 45A to junction 46A, through the superconducting gate conductor of cryotron 18A to junction 47A thence continues along a line 70 through the superconducting gate conductors of cryotrons 19A, 20A, and 21A (FIGS. 1*c* and 1*a*) to a line 71. Next, the current continues along line 71 and through the superconducting gate conductor of cryotron 22A and, because the gate conductor of cryotron 23A is resistive (Table II), through the superconducting gate conductor of cryotron 38A to a line 72. This current flow along line 72 is effective to switch stage B to the ON state by flowing through the control conductor of set cryotron 11B (FIG. 1C), the possible paths in parallel with line 72 being blocked by the resistive gate conductors of cryotrons 33C, 33D, 33E and 36F (FIGS. 1*a* and 1*b*). The current next flows along a line 73 and through the superconducting gate conductor of cryotron 39A to line 71. Next, this current flows along line 71, through the superconducting gate conductors of cryotrons 24A, 25A and reset cryotron 16A returning to line 10 at junction 17A. Stage A is effective, therefore, when it itself is switched to the ON state to thereafter switch stage B to the ON state.

With stage B switched to the ON state, current from stage A flows along line 10 to junction 15B, through the control conductor of output cryotron 14B to switch the gate conductor thereof resistive, thence along a line 74, through the superconducting gate conductors of cryotrons 18B and 19B and, since the gate conductor of cryotron 20B is resistive (Table II), through the superconducting gate conductor of cryotron 32B to a line 75. This current flow along line 75 is effective to switch stage C to the ON state by flowing through the control conductor of set cryotron 11C (FIG. 1*c*), the possible paths in parallel with line 75 being blocked by the resistive gate conductors of cryotrons 32A, 37D, 37E, and 34F (Figs. 1*a* and 1*b*). The current next flows along a line 76 and through the superconducting gate conductor of cryotron 33B to line 74. Next, the current flows along line 74 and through the superconducting gate conductor of cryotron 21B to a line 77, through the superconducting gate conductors of cryotrons 22B, 23B, 24B and, since the gate conductor of cryotron 25B is resistive, through the superconducting gate conductor of cryotron 42B to a line 80. This current flow along line 80 is effective to switch stage A to the OFF state by flowing through the control conductor of reset cryotron 16A (FIG. 1*c*), the possible paths in parallel with line 80 being blocked by the resistive gate conductors of cryotrons 42C, 42D, 42E and 42F (FIGS. 1*c* and 1*b*). The current next flows along a line 81 and through the superconducting gate conductor of cryotron 43B to line 77. Next, this current flows along line 77 and through the gate conductor of reset cryotron 16B returning to line 10 at junction 17B. Stage B is effective therefore, when it itself is switched to the ON state, to thereafter switch stage C to the ON state and stage A to the OFF state.

In a manner similar to that described immediately above with respect to stage B, it is seen that the remaining operating stages are conditioned to be effective when switched to the ON state, to thereafter switch the next succeeding stage to the ON state and the immediate preceding stage to the OFF state. That is, stage C when swicthed to the ON state by stage B is effective to switch stage D to the ON state and stage B to the OFF state; stage D when switched to the ON state by stage C is effective to switch stage E to the ON state and stage C to the OFF state; stage E when switched to the ON state by stage D is effective to only switch stage D to the OFF state, since there is no succeeding stage in the chain illustrated by way of example, in FIGS. 1*a* through 1*d*, stage E remaining in the ON state. The cycle of operation is repeated by the momentary closure of switch 58 thereby energizing starting stage F which is then effective to switch stage E to the OFF state and to switch stage A to the ON state, and again a sequence of output manifestations is developed commencing with the lowest order stage and progressing through the highest order stage.

Figure 3:
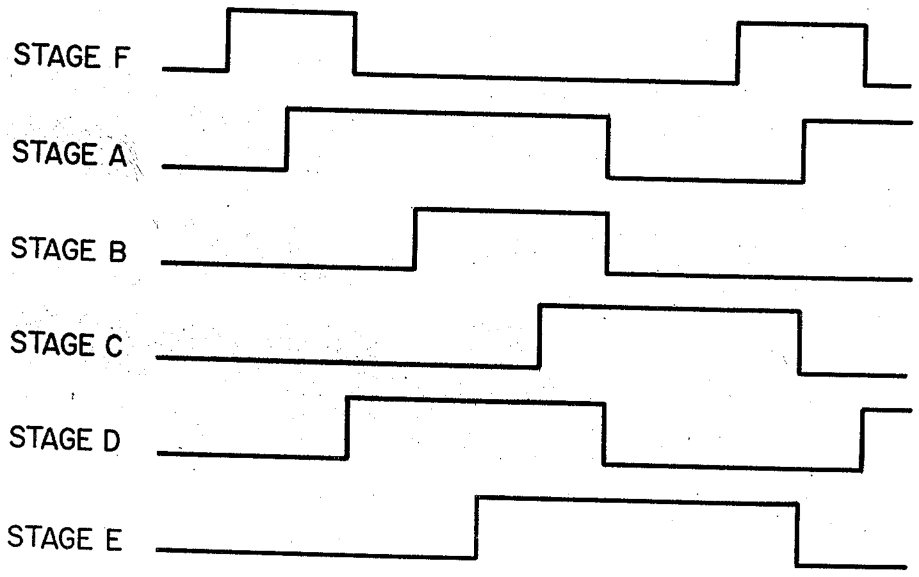
FIG. 3 illustrates the output manifestation as a function of time of the switching network of the invention during a cycle of operation of a second program.

The second described program illustrates the manner in which a more complex order of outputs is developed and further wherein more than one stage is simultaneously in the ON stage. FIG. 3 illustrates the outputs as a function of time. Table III lists the state of each matrix cryotron in order to develop the outputs shown in FIG. 3.

*Table III*

| Stage A | Stage B | Stage C | Stage D | Stage E | Stage F |
|---|---|---|---|---|---|
| 18A—S | 18B—S | 18C—R | 18D—S | 18E—S | 18F—S |
| 28A—R | 28B—R | 28C—S | 28D—R | 28E—R | 28F—R |
| 29A—R | 29B—R | 29C—S | 29D—R | 29E—R | 29F—R |
| 19A—S | 19B—S | 19C—S | 19D—S | 19E—S | 19F—S |
| 30A—R | 30B—R | 30C—R | 30D—R | 30E—R | 30F—R |
| 31A—R | 31B-R | 31C—R | 31D—R | 31E—R | 31F—R |
| 20A—S | 20B—S | 20C—S | 20D—R | 20E—S | 20F—R |
| 32A—R | 32B—R | 32C—R | 32D—S | 32E—R | 32F—S |
| 33A—R | 33B—R | 33C—R | 33D—S | 33E—R | 33F—S |
| 21A—S | 21B—R | 21C—S | 21D—S | 21E—S | 21F—S |
| 34A—R | 34B—S | 34C—R | 34D—R | 34E—R | 34F—R |
| 35A—R | 35B—S | 35C—R | 35D—R | 35E—R | 35F—R |
| 22A—R | 22B—S | 22C—S | 22D—S | 22E—R | 22F—S |
| 36A—S | 36B—R | 36C—R | 36D—R | 36E—S | 36F—R |
| 37A—S | 37B—R | 37C—R | 37D—R | 37E—S | 37F—R |
| 23A—S | 23B—S | 23C—S | 23D—S | 23E—S | 23F—R |
| 38A—R | 38B—R | 38C—R | 38D—R | 38E—R | 38F—S |
| 39A—R | 39B—R | 39C—R | 39D—R | 39E—R | 39F—S |
| 24A—S | 24B—S | 24C—R | 24D—S | 24E—S | 24F—R |
| 40A—R | 40B—R | 40C—S | 40D—R | 40E—R | 40F—S |
| 41A—R | 41B—R | 41C—S | 41D—R | 41E—R | 41F—S |
| 25A—S | 25B—S | 25C—R | 25D—S | 25E—S | 25F—S |
| 42A—R | 42B—R | 42C—S | 42D—R | 42E—R | 42F—R |
| 43A—R | 43B—R | 43C—S | 43D—R | 43E—R | 43F—R |
| | | | | | 50F—S |
| | | | | | 52F—R |
| | | | | | 53F—R |
| | | | | | 51F—S |
| | | | | | 54F—R |
| | | | | | 55F—R |

Referring now to FIG. 3, the sequence of operation can briefly be summarized as follows: The initial closure of switch 58 (FIG. 1*d*) is effective to energize starting stage F which is conditioned to switch stage A to the ON state; stage A is conditioned to thereafter switch stage D to the ON state; stage D is conditioned to switch stage B to the ON state; stage B is conditioned to switch stage E to the ON state; stage E is conditioned to switch stage C to the ON state; and stage C is conditioned to switch stages A, B and D to the OFF state. Thus, at the end of the sequence of operations, stages C and E remain in the ON state. However, the next closure of switch 58 is effective to switch stages C and E to the OFF state as well as commencing a new cycle of operation by switching stage A to the ON state.

It should now be apparent from the above illustrative programs, that each of the stages is programmable to switch one or more stages to the ON state and/or one or more stages to the OFF state and further that a single superconducting path exists through each cryotron matrix when each control conductor of the set and reset cyrotrons is under control of a unique stage. Still more complex programs are possible, however, wherein stage A is first under control of stage C, by way of example, and at a later time during an operating cycle is under control of stage B. This involves merely changing the matrix conditioning during the cycle of operation as will be understood by those skilled in the art. For example, in order to ensure the current from source 8 initially flows in the normal path, a first closure of switch 58 is effective to direct the current from source 57 through the matrix of stage F and thence through the control conductor of each reset cryotron 16A through 16E. Switch 58 is then opened, the matrix of stage F is conditioned for the desired program. A second closure of switch 58 is then effective to commence the desired sequence of operations.

Although each cryotron in the schematic diagram of FIGS. 1*a* through 1*d* has been illustrated employing coils for the control conductors, this form has been employed solely as an aid in following the various current paths, it being understood that thin film cryotrons of the type described in copending application Serial No. 625,512, filed November 30, 1956, on behalf of Richard L. Garwin and assigned to the assignee of this invention, may be employed. Further, the apparatus and means for maintaining a superconductive temperature have neither been shown nor described since they are well known to those skilled in the art.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A superconducting switching network comprising; a plurality of superconductive stages; means maintaining said stages at a superconductive temperature; each of said stages including first and second parallel superconductive current paths; a current source; means connecting said source in series with said paths in each of said stages, whereby current flow in said first path is indicative of a first condition and current flow in said second path is indicative of a second condition; and means for establishing current flow in said paths in a predetermined sequence; said last named means including first control means for each of said stages for rendering a portion of said first path resistive in response to current flow therethrough, second control means for each of said stages for rendering a portion of said second path resistive in response to current flow therethrough, and means connecting a number of said first and second control means in series with the second paths of selected stages in accordance with a predetermined program, whereby each of said stages is selectively effective when current flows through said second path thereof to shift one or more of said stages from said first condition to said second condition and to shift one or more of said stages from said second condition to said first condition.

2. The network of claim 1 including a further superconductive stage; means maintaining said further stage at a superconductive temperature; and means for conditioning said further stage to direct current from said source through said first path of each of said plurality of stages during a first time interval and to direct current from said source through a number of said second paths of said plurality of stages during a second time interval.

3. A superconductive circuit comprising; a plurality of superconductive network stages; means maintaining said stages at a superconductive temperature; each of said stages including first and second parallel superconductive current paths; current supply means connected to said stages for supplying current thereto; means directing current from said supply through each of said first paths during a first time interval; and means for sequentially shifting current from each of said first paths to each of said second paths during later time intervals including control means for each of said stages effective to render a portion of said paths resistive in response to current flow therethrough, and means selectively operable for connecting a number of said control means in series with the second path of a number of said stages, whereby current flow through the second path of predetermined stages is effective to shift current from said first paths to said second paths in selected ones of said stages and to shift current from said second paths to said first paths in selected others of said stages.

References Cited by the Examiner

UNITED STATES PATENTS

| | | | |
|---|---|---|---|
| 2,832,897 | 4/58 | Buck | 340—173.1 |
| 2,936,435 | 5/60 | Buck. | |
| 2,962,681 | 11/60 | Lentz. | |
| 2,969,469 | 1/61 | Richards | 340—173.1 |
| 3,001,178 | 9/61 | Buck | 340—173.1 |
| 3,019,353 | 1/62 | Mackay | 340—173.1 |
| 3,019,354 | 1/62 | Anderson et al. | 340—173.1 |

OTHER REFERENCES

Publication I: Proceedings of I.R.E., April 1956, pp. 482–493.

Publication II: Electrical Manufacturing, February 1958, title being, Cryogenic Devices in Logical Circuitry and Storage, pp. 78–83.

IRVING L. SRAGOW, *Primary Examiner.*

EVERETT R. REYNOLDS, *Examiner.*